United States Patent
Huynh et al.

(10) Patent No.: US 9,708,054 B2
(45) Date of Patent: Jul. 18, 2017

(54) METHOD AND APPARATUS FOR OPTIMIZING A LOAD IN A FLIGHT CONTROL SYSTEM WHILE AN AIRCRAFT IS ON THE GROUND

(75) Inventors: Neal Van Huynh, Bellevue, WA (US); Peter James Andersen, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 1413 days.

(21) Appl. No.: 13/237,731

(22) Filed: Sep. 20, 2011

(65) Prior Publication Data

US 2012/0025033 A1 Feb. 2, 2012
US 2015/0148991 A9 May 28, 2015

Related U.S. Application Data

(63) Continuation of application No. PCT/US2009/038368, filed on Mar. 26, 2009.

(51) Int. Cl.
*B64C 13/02* (2006.01)
*B64C 13/16* (2006.01)
*B64C 13/50* (2006.01)
*B64D 45/00* (2006.01)
*G05D 1/00* (2006.01)

(52) U.S. Cl.
CPC ............ *B64C 13/16* (2013.01); *B64C 13/503* (2013.01); *B64D 45/0005* (2013.01); *G05D 1/0066* (2013.01)

(58) Field of Classification Search
CPC ....... B64C 13/38; B64C 13/50; B64C 13/503; B64C 13/16
USPC ............................ 701/3; 244/76 R, 99.2, 228
See application file for complete search history.

(56) References Cited

U.S. PATENT DOCUMENTS

| | | | |
|---|---|---|---|
| 5,527,002 A | 6/1996 | Bilange et al. | |
| 5,743,490 A | 4/1998 | Gillingham et al. | |
| 2006/0226285 A1* | 10/2006 | Matsui | 244/99.6 |
| 2009/0014595 A1 | 1/2009 | Rougelot et al. | |
| 2010/0078518 A1* | 4/2010 | Tran et al. | 244/87 |
| 2010/0127132 A1* | 5/2010 | Kirkland | 244/76 R |

FOREIGN PATENT DOCUMENTS

GB 2196588 A 5/1988

OTHER PUBLICATIONS

Fielding et al., Non-Linearities in Flight Control Systems, Nov. 2003, The Aeronautical Journal.*
International Search Report and Written Opinion issued on Dec. 30, 2009 for PCT/US2009/038368.

* cited by examiner

*Primary Examiner* — Mussa A Shaawat
*Assistant Examiner* — Nadeem Odeh
(74) *Attorney, Agent, or Firm* — Yee & Associates, P.C.

(57) ABSTRACT

A method, apparatus, and computer program product for managing movement of a flight control surface on an aircraft. A control signal is received to move the flight control surface to a position. Travel in a number of actuators in a plurality of actuators coupled to the flight control surface is limited to an amount that reduces a load on the number of actuators in the plurality of actuators in response to receiving the control signal while the aircraft is on the ground and the speed of the aircraft is less than a threshold.

19 Claims, 8 Drawing Sheets

METHOD AND APPARATUS FOR OPTIMIZING A LOAD IN A FLIGHT CONTROL SYSTEM WHILE AN AIRCRAFT IS ON THE GROUND

This application is continuation of PCT Application PCT/US2009/038368, filed Mar. 26, 2009.

BACKGROUND

The present disclosure relates generally to aircraft and, in particular, to a method and apparatus for controlling an aircraft. Still more particularly, the present disclosure relates to a method, apparatus, and computer program product for controlling actuators in an aircraft.

A flight control system in an aircraft may include flight control surfaces, controls in a cockpit, connecting linkages, actuators, and other suitable components to move the flight control surfaces. Movement of these flight control surfaces controls the direction of an aircraft in flight. These flight control surfaces may include, for example, a rudder, elevators, flaps, ailerons, slats, spoilers, and other suitable types of control surfaces. The controls in a cockpit that may be used include, for example, a control column and wheel, rudder pedals, a center stick, a side stick, and other suitable controls. A control column may be used to move elevators and/or ailerons. The rudder pedals may be used to move a rudder on a vertical stabilizer and/or spoilers.

Checks of a flight control system may be made at different points in time in the life cycle of an aircraft. For example, a check of a flight control system may be performed while an aircraft is undergoing a certification process prior to delivery. These checks also may be made prior to each flight of an aircraft and/or during maintenance.

One of the operations that may be performed during a flight control system check is to move a control to travel stops for the flight control surface in both directions. A travel stop is any predefined position within a flight control system. This travel stop includes, for example, neutral, detents, and end stroke positions.

For example, the column may be moved to travel stops for the flight control surface in both directions to verify that freedom of movement occurs and that the controls return to the center. Movement of rudder pedals to the travel stops in both directions may be performed to verify the freedom of movement of the rudder and rudder control system, the normal feel force of rudder pedals, and that the rudder pedals return to the center position. During these operations, the operator may confirm that with a full input to a control in the cockpit that the respective flight control surface and the control system both reach full travel in both directions.

For example, with rudder pedals, the rudder control system and rudder travel to their stops with the movement of the rudder pedals to the full travel in both directions. These types of tests may generate loads on the rudder actuation system for the rudder control system and structures associated with the rudder actuation system. Further, with these types of tests, the redundant actuation systems for the rudder are also moved at the same time.

Redundant actuation systems are used to control the aircraft control surface, such that an improperly functioning actuation system does not result in an inability to move that control surface. This type of redundancy may result in a number of different issues. For example, a force fight between actuators may occur when one actuator arrives at a proper commanded position and then the actuator is moved by a second or third actuator, which has not yet reached the proper commanded position. This type of condition results in one actuator opposing the force of another actuator. Further, additional force may occur in the form of a bottoming load when an actuator reaches a travel stop. The loads generated by these checks may be referred to as control check loads.

Performing this type of control check in pre-flight and during maintenance may result in a large percentage of the lifetime fatigue loads placed on these actuation systems. During the certification phase, the control check load on the actuation systems is measured. If the control check load is greater than the load taken into account in the design phase, a redesign may be required before the aircraft can be certified.

Existing parts may be removed and replaced with new parts. This type of process is currently used to prevent undesired loads on the flight control system during actual use. The redesign may include strengthening the actuator, the structures associated with the flight control surface, and other suitable components. The strengthening of these components may include selecting a different material, increasing the amount of material, or other design and/or structural changes.

This type of redesign may increase the life of these components either by increasing the allowable stress by changing material or by insuring the stresses due to control check loads are equal to and/or less than the ones taken into account in the design of the systems. The material change may be, for example, aluminum to steel. This redesign, however, may increase the expense and time needed to certify an aircraft. Weight will be increased in either instance. Further, during the entire life cycle of an aircraft, various components may change in performance in a manner that may increase the control check load above what is desired based on the original design of the aircraft.

As a result, this type of situation currently requires the aircraft to be taken out of service for maintenance in which various structures, such as the actuator and fittings, are replaced with the redesigned components. This type of process increases the expense for maintaining aircraft. Also, this situation may result in the aircraft being out of service for additional periods of time.

Further, in providing new parts and/or redesigned parts, the time needed for suppliers to provide these parts may result in increased time to certification and/or time that an aircraft is out of service.

Modern aircraft actuation control systems employ closed-loop control with the associated electrical hardware and software. The electrical hardware may change with time. Thus, a periodic rigging process may be added to reduce the tolerance effects that may occur. A periodic rigging process includes a manual calibration and/or adjustment of the electrical hardware and software in each actuation system to match the actual position of the control surface. The rigging process also increases the expense for maintaining an aircraft. The rigging takes time, and the aircraft is unavailable when this process is performed.

Therefore, it would be advantageous to have a method and apparatus that may take into account one or more of the issues discussed above, as well as possibly other issues.

SUMMARY

In one advantageous embodiment, a method is presented for managing movement of a flight control surface on an aircraft. A control signal is received to move the flight control surface to a position. Travel in a number of actuators in a plurality of actuators coupled to the flight control surface is limited to an amount that reduces a load on the number of actuators in the plurality of actuators in response to receiving the control signal while the aircraft is on the ground and the speed of the aircraft is less than a threshold.

In another advantageous embodiment, an apparatus comprises a computer and a control law. The control law is capable of executing on the computer. The control law is capable of receiving a control signal to move a flight control surface to a position. The control law is also capable of limiting travel in a number of actuators in a plurality of actuators coupled to the flight control surface to an amount that reduces a load on the number of actuators in the plurality of actuators while the aircraft is on the ground and the speed of the aircraft is less than a threshold.

In yet another advantageous embodiment, a computer program product is presented for managing movement of a flight control surface on an aircraft. The computer program product comprises a computer recordable storage medium and program code. The program code is stored on the computer recordable storage medium. Program code is present for receiving a control signal to move the flight control surface to a position. Program code is present for limiting travel in a number of actuators in a plurality of actuators coupled to the flight control surface to an amount that reduces a load on the number of actuators in the plurality of actuators in response to receiving the control signal while the aircraft is on the ground and the speed of the aircraft is less than a threshold.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
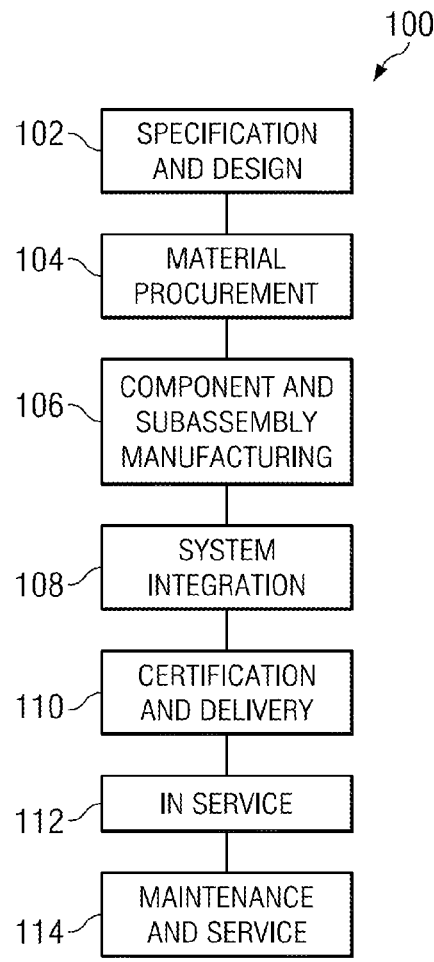
FIG. 1 is a diagram illustrating an aircraft manufacturing and service method in accordance with an advantageous embodiment.
Figure 2:
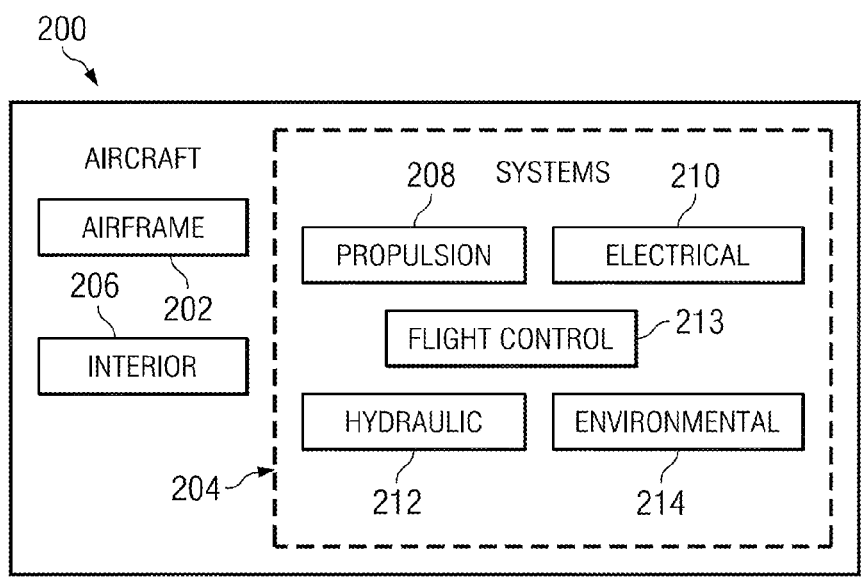
FIG. 2 is a schematic diagram of an aircraft system in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, flight control system 213, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in certification and delivery 110, in service 112, and/or during maintenance and service 114 in FIG. 1.

One or more of the different advantageous embodiments provide a method and apparatus for managing a flight control system in an aircraft. A control signal may be received to move a control surface in the flight control system to a position. In response to receiving a control signal while the aircraft is on the ground, the travel and/or rate in a plurality of actuators coupled to the control surface in the flight control system is limited to an amount that reduces a load on the plurality of actuators. By reducing the load on the plurality of actuators, the life of the flight control system may be increased. In reducing the load on the actuators, the load on other components coupled to the actuators directly and/or indirectly also may be reduced.

Figure 3:
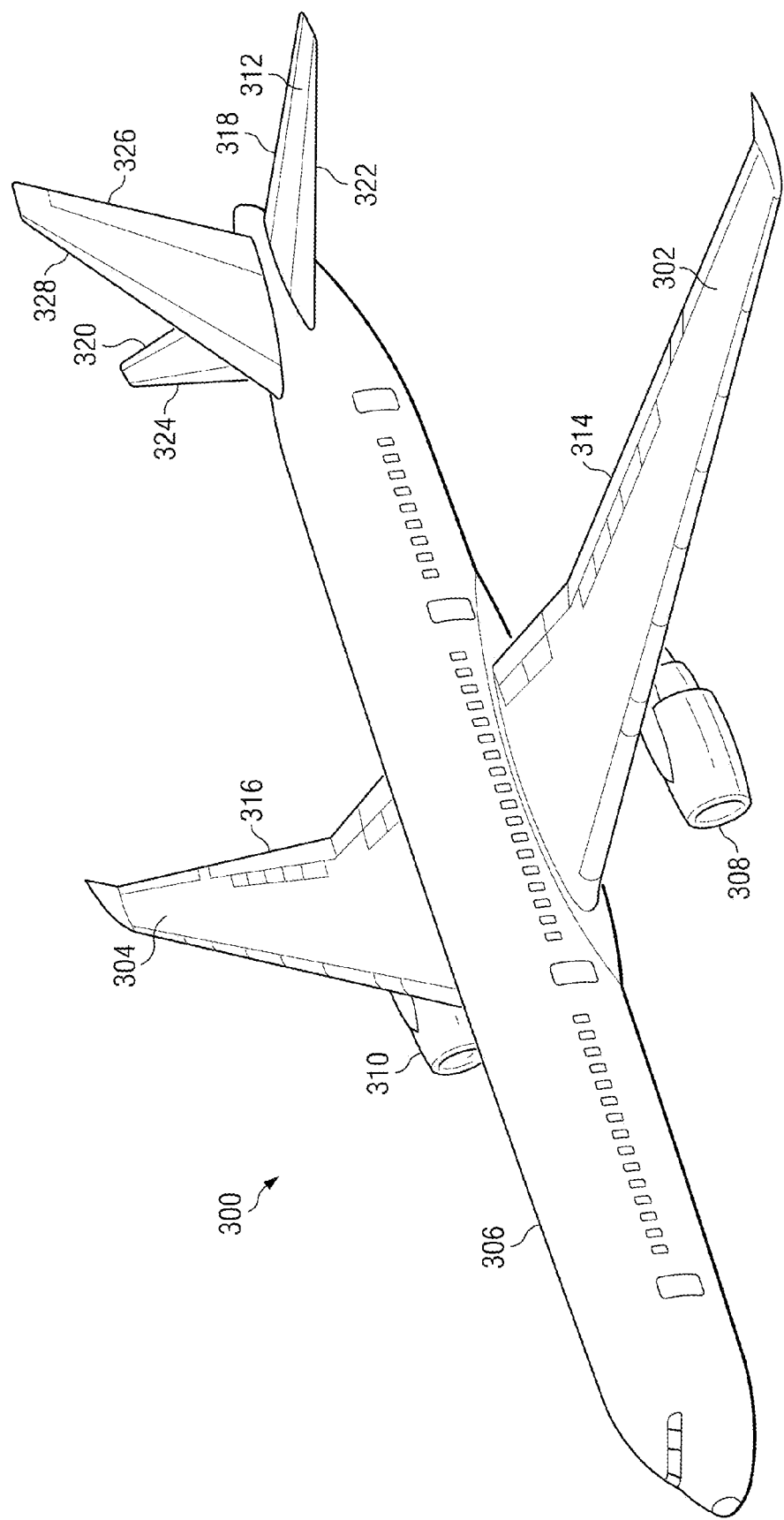
FIG. 3 is a diagram of an aircraft in which an advantageous embodiment may be implemented.

With reference to FIG. 3, a diagram of an aircraft is depicted in which an advantageous embodiment may be implemented. Aircraft 300 is an example of one implementation of aircraft 200 in FIG. 2 in which a flight control system may be implemented in accordance with an advantageous embodiment. In this illustrative example, aircraft 300 has wings 302 and 304 attached to body 306.

Aircraft 300 includes wing-mounted engine 308, wing-mounted engine 310, vertical stabilizer 328, and tail 312. Any control surface controlled by an actuator may be implemented using an advantageous embodiment. Examples of other types of control surfaces are, for example, without limitation, a t-tail, a tri-tail engine, a quad-wing engine, a blended wing, a ruddervator, a flaperon, and any other type of suitable control surface.

In these illustrative examples, the flight control system may include control surfaces on aircraft 300. Examples of these control surfaces are flaps 314 and 316 on wings 302 and 304. Other examples include elevators 318 and 320 on horizontal stabilizers 322 and 324 on tail 312. Rudder 326 and vertical stabilizer 328 on aircraft 300 is another example of a flight control surface that may be a part of the flight control system for aircraft 300.

Figure 4:
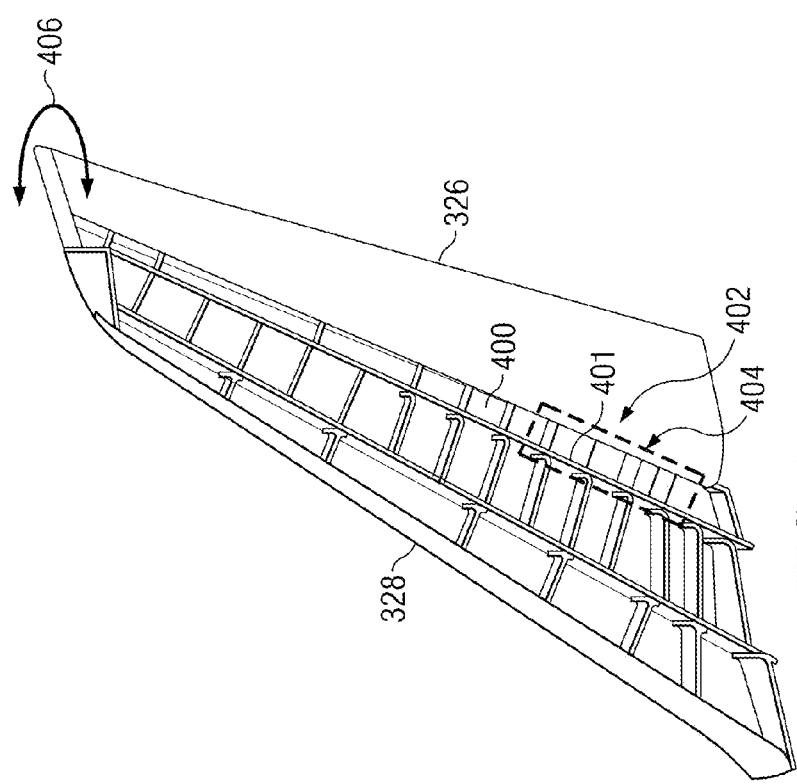
FIG. 4 is a diagram of a portion of a vertical stabilizer in accordance with an advantageous embodiment.

With reference now to FIG. 4, a diagram of a portion of vertical stabilizer 328 in FIG. 3 is depicted in accordance with an advantageous embodiment. In this example, rudder 326 may be attached to hinge ribs 400, which are attached to rear spar 401 of vertical stabilizer 328. Rotational movement of rudder 326 may be controlled by rudder actuation system 402 in section 404. Rudder actuation system 402 may be part of the flight control system in these examples. Rudder actuation system 402 may be controlled to move rudder 326 in the direction of arrow 406.

Figure 5:
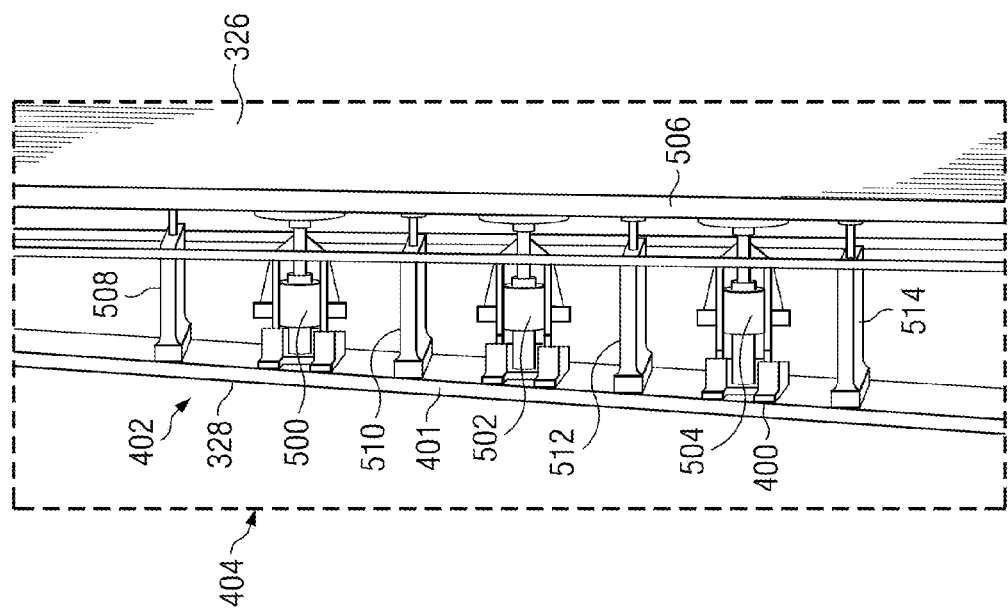
FIG. 5 is a diagram illustrating a detailed view of a particular flight control actuation system in accordance with an advantageous embodiment.

Turning now to FIG. 5, a diagram illustrating a detailed view of a flight control actuation system is depicted in accordance with an advantageous embodiment. In this example, a more detailed view of section 404 is depicted in accordance with an advantageous embodiment.

Rudder actuation system 402, in this example, includes actuators 500, 502, and 504 that are located between rear spar 401 and rudder 326. These actuators also are connected to front spar 506 of rudder 326. Front spar 506 is rotatably hinged about the trailing edge ribs, such as trailing edge ribs 508, 510, 512, and 514. Actuators 500, 502, and 504 may actuate to rotate rudder 326. These actuators may be, for example, hydraulic and/or electro-mechanical actuators.

The different advantageous embodiments recognize and take into account that when all three actuators, actuators 500, 502, and 504, are operated simultaneously, the loads on the actuators and structures coupled directly to and/or indirectly to these actuators may increase.

Figure 6:
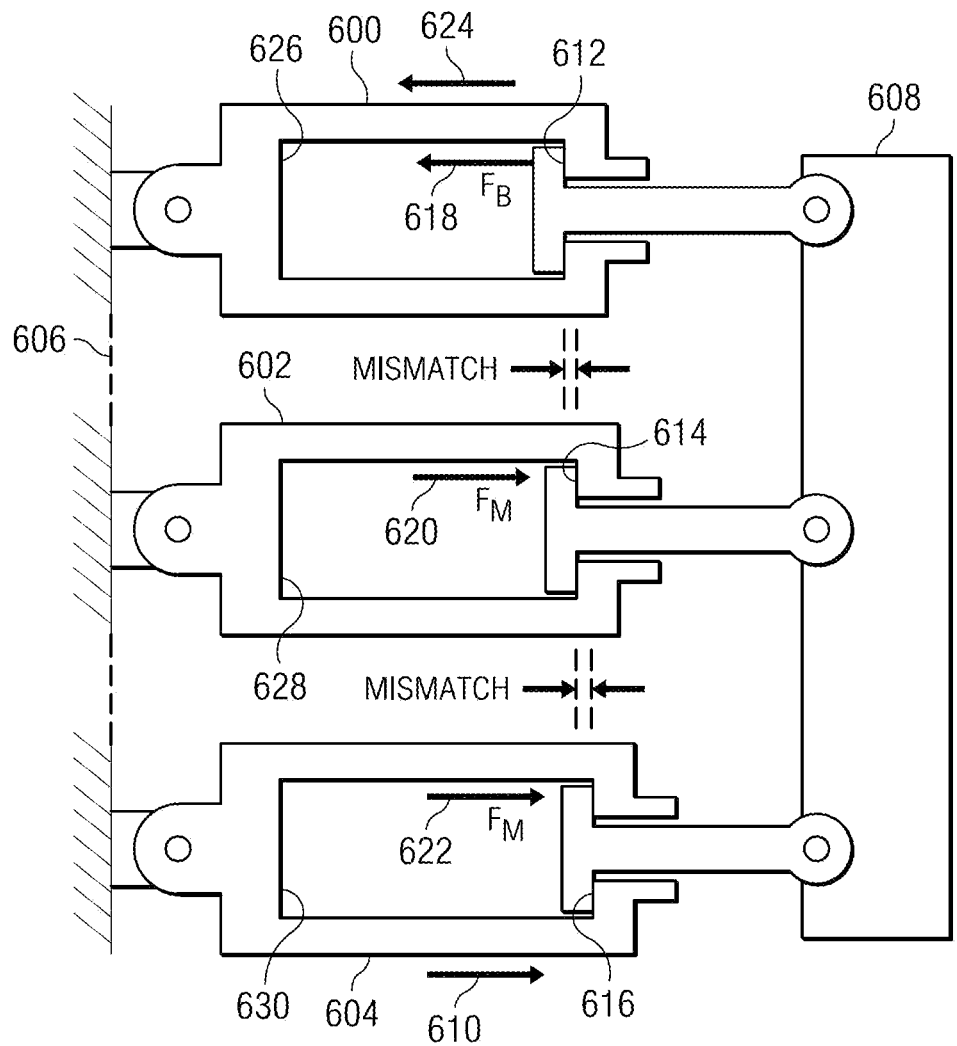
FIG. 6 is a diagram illustrating loads generated by a control check process in accordance with an advantageous embodiment.

Turning now to FIG. 6, a diagram illustrating loads generated by a control check process is depicted in accordance with an advantageous embodiment. Actuators 600, 602, and 604 are connected to aircraft structure 606 and control surface structure 608. These actuators may be examples of actuators 500, 502, and 504 in FIG. 5 and may be electro-mechanical and/or hydraulic actuators.

In performing a control check process, actuators 600, 602, and 604 may be operated at the same time to move in the direction of arrow 610. Each of these actuators may generate a bottoming load when actuators 600, 602, and 604 travel to end stops 612, 614, and 616, respectively. An end stop for an actuator is the farthest position an actuator can reach in a direction. For example, if the actuator is a linear actuator, an end stop may be the farthest travel distance outward and/or the farthest travel distance inward that a moveable portion of the actuator can travel.

The bottoming load is a function of the travel rate of the actuator, as well as the inertia and spring rate. In this example, actuator 600 is shown with bottoming load $F_B$ 618. Actuators 602 and 604 have not yet generated a bottoming load in this example. Actuators 602 and 604 have a mismatch in the distance of travel because they have not yet reached end stops 614 and 616, respectively, in these examples. This mismatch results in force mismatch loads $F_M$ 620 and $F_M$ 622. This mismatch in load may result in a force fight in the actuation load loop of the control system. Actuation load loop is the path of the force fight load between the actuators.

In this situation, actuator 600 has reached end stop 612, while actuators 602 and 604 have not yet reached end stops 614 and 616, respectively. As a result, the commanded position of first actuator may be moved by actuator 602 and/or actuator 604. The control system attempts to move actuator 600 back to end stop 612. This situation results in actuators 600, 602, and 604 operating in opposition to one another.

The mismatch may occur due to different travel speeds, differences in actual lengths in actuators 600, 602, and 604, and/or other factors between these actuators. A bottoming load also may occur when actuators 600, 602, and 604 move in the direction of arrow 624 to end stops 626, 628, and 630, respectively.

The bottoming loads and the loads generated by force fights between actuators may result in a superimposed load on various components. These components may include the actuators, the structure to which the actuators are connected to on the control surface, the structure of the aircraft to which the actuators are connected, fittings used to attach the actuators to the structures, links, and other structures that may be coupled to directly and/or indirectly to the actuators.

Thus, by limiting the travel and/or rate of the actuators in the control system during the performance of the control check, these loads may be reduced and/or eliminated. These control checks may occur when the aircraft is on the ground. Additionally, these control checks may only occur when the aircraft is on the ground and the speed of the aircraft is less than some threshold.

Figure 7:
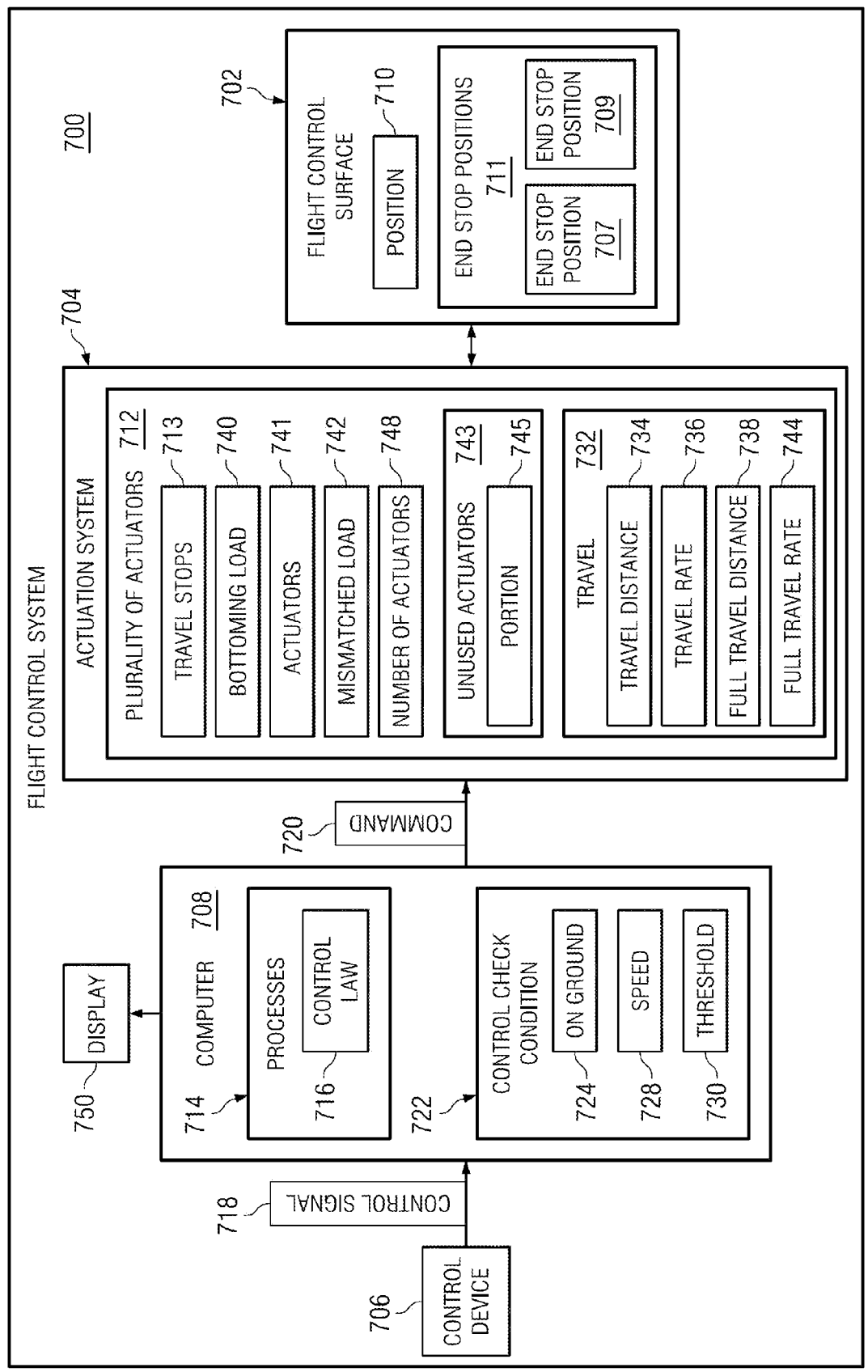
FIG. 7 is a schematic diagram of a flight control system in accordance with an advantageous embodiment.

With reference now to FIG. 7, a diagram of a flight control system is depicted in accordance with an advantageous embodiment. Flight control system 700 is an example of a flight control system that may be implemented in aircraft 300 in FIG. 3. Flight control system 700 may include flight control surface 702, actuation system 704, control device 706, and computer 708.

Flight control surface 702 is any surface or structure that may be used to control the movement or direction of an aircraft during flight. The flight control surface also may aid aircraft directional movement or stopping distance while the aircraft is on the ground. Flight control surface 702 may take various forms. Flight control surface 702 may be, for example, without limitation, a rudder, a flap, an aileron, a spoiler, an elevator, an airbrake, or some other suitable control surface.

Actuation system 704 controls position 710 of flight control surface 702. In these illustrative examples, position 710 may include end stop positions 711. End stop positions 711, in these examples, include end stop position 707 and end stop position 709. End stop position 707 is a position in which flight control surface 702 has moved as far as possible in one direction. End stop position 709 is a position in which flight control surface 702 has moved in the other direction to the furthest extent possible.

Travel stops 713 in plurality of actuators 712 may define or control when end stop positions 711 for flight control surface 702 have been reached. Actuation system 704 may include plurality of actuators 712. Plurality of actuators 712 may include actuators 741. Each actuator in actuators 712 or plurality of actuators 712 is coupled to flight control surface 702 in these examples. These actuators may be coupled directly or indirectly to flight control surface 702.

Control device 706 may be located in a cockpit of an aircraft. Control device 706 may take various forms. For example, without limitation, control device 706 may be a control column, rudder pedals, sticks, or some other suitable control device.

Computer 708 controls actuation system 704 to move flight control surface 702 to position 710, which may include end stop positions 711. Computer 708 may control position 710 of flight control surface 702 using processes 714. Control law 716 may be a particular process in processes 714 that may be used to control movement of flight control surface 702.

In these examples, control device 706 may generate control signal 718 to move flight control surface 702 to position 710. Computer 708 receives control signal 718 and generates command 720, which is sent to actuation system 704. Command 720 controls the movement of plurality of actuators 712 in actuation system 704 to move flight control surface 702 to position 710.

In these examples, control law 716 may change the manner in which plurality of actuators 712 is controlled when control check condition 722 is present. Control check condition 722 is a condition that may be present when the aircraft is on ground 724. Further, this condition also may be present when the aircraft is on ground 724 and speed 728 is less than threshold 730.

Control law 716 may limit travel 732 for plurality of actuators 712. Travel 732 may include at least one of travel distance 734 and travel rate 736. As used herein, the phrase "at least one of", when used with a list of items, means that different combinations of one or more of the items may be used and only one of each item in the list may be needed. For example, "at least one of item A, item B, and item C" may include, for example, without limitation, item A, or item A and item B. This example also may include item A, item B, and item C, or item B and item C.

For example, control law 716 may limit travel 732 by reducing travel distance 734 to a portion of full travel distance 738. Travel distance 734 may be around 90 percent of full travel distance 738. Of course, travel distance 734 may be selected to be any distance that may reduce and/or avoid bottoming load 740 in plurality of actuators 712. Further, travel distance 734 may be selected to reduce and/or avoid mismatched load 742.

Additionally, travel 732 may be limited by reducing travel rate 736 to a portion of full travel rate 744. For example, travel rate 736 may be reduced to around 50 percent of full travel rate 744. In this manner, if bottoming load 740 occurs, bottoming load 740 may be reduced because of a reduction in travel rate 736.

Bottoming load 740 may be avoided by reducing travel distance 734, and mismatched load 742 may be avoided by preventing plurality of actuators 712 from reaching travel stop 713. Depending on the particular implementation, number of actuators 748 in plurality of actuators 712 may be controlled in this manner. Number of actuators 748 may be a portion or all of plurality of actuators 712, depending on the particular implementation. If number of actuators 748 is a single actuator, mismatched load 742 may be avoided. Further, bottoming load 740 may be avoided for other actuators in plurality of actuators 712 that are not used.

Additionally, in the different advantageous embodiments, control law 716 also may control travel 732 by controlling number of actuators 748, which may actually operate when control check condition 722 is present. For example, number of actuators 748 may be one actuator within plurality of actuators 712. Travel stops 713 are not reached when full travel distance 738 is not reached. Number of actuators 748 may be selected as an actuator that was not previously used during control check condition 722 during a previous flight. These actuators that were not previously used may be unused actuators 743. Portion 745 of unused actuators 743 may be selected in these examples.

By only using number of actuators 748, travel distance 734 may not need to be reduced to less than full travel distance 738. Further, travel rate 736 also may not need to be reduced. In yet other advantageous embodiments, even when number of actuators 748 is used, travel distance 734 and/or travel rate 736 also may be reduced, depending on the particular implementation.

In these illustrative examples, travel distance 734 in number of actuators 748 may be measured using a position transducer in the actuator. This position transducer measures travel distance 734. Actuation system 704 converts command 720 into travel distance 734. Actuation system 704 compares travel distance 734 with position 710.

This comparison may be made at a summation point in a closed loop-control system. The value for travel distance 734 may be sent to each of plurality of actuators 712 to control travel distance 734. Further, depending on the particular implementation, different actuators in plurality of actuators 712 may have a different value for travel distance 734. Travel rate 736 also may be controlled by changing the value sent to plurality of actuators 712 in command 720.

Although travel distance 734 may be reduced to a portion of full travel distance 738 to avoid travel stops 713, display 750 may show that flight control surface 702 has moved to end stop positions 711. This presentation on display 750 may allow a pilot or other operator to confirm that the control surface has moved to end stop positions 711, even though the movement may be short of those positions.

For example, when the aircraft is on the ground and the speed of the aircraft is less than a threshold, a full left rudder pedal input results in around 90 percent of full travel distance 738 and 90 percent of end stop positions 711. This situation may cause a rudder travel of around 27 degrees, instead of around 30 degrees to the left of the rudder neutral position.

The illustration of flight control system 700 in FIG. 7 is not meant to imply physical or architectural limitations to the manner in which flight control system 700 may be implemented. For example, other components in addition to, or in place of, the ones illustrated in flight control system 700 may be used. Further, in some advantageous embodiments, some components illustrated for flight control system 700 may be unnecessary.

For example, in some advantageous embodiments, additional flight control surfaces, in addition to flight control surface 702, may be present. Further, actuation system 704 may be replaced with some other system capable of moving flight control surface 702. In yet other advantageous embodiments, control device 706 may be unnecessary. Control device 706 may be unnecessary in an unmanned aircraft. With this type of implementation, control device 706 may be replaced with a process controlled by a computer and/or a remote-controlled system.

Figure 8:
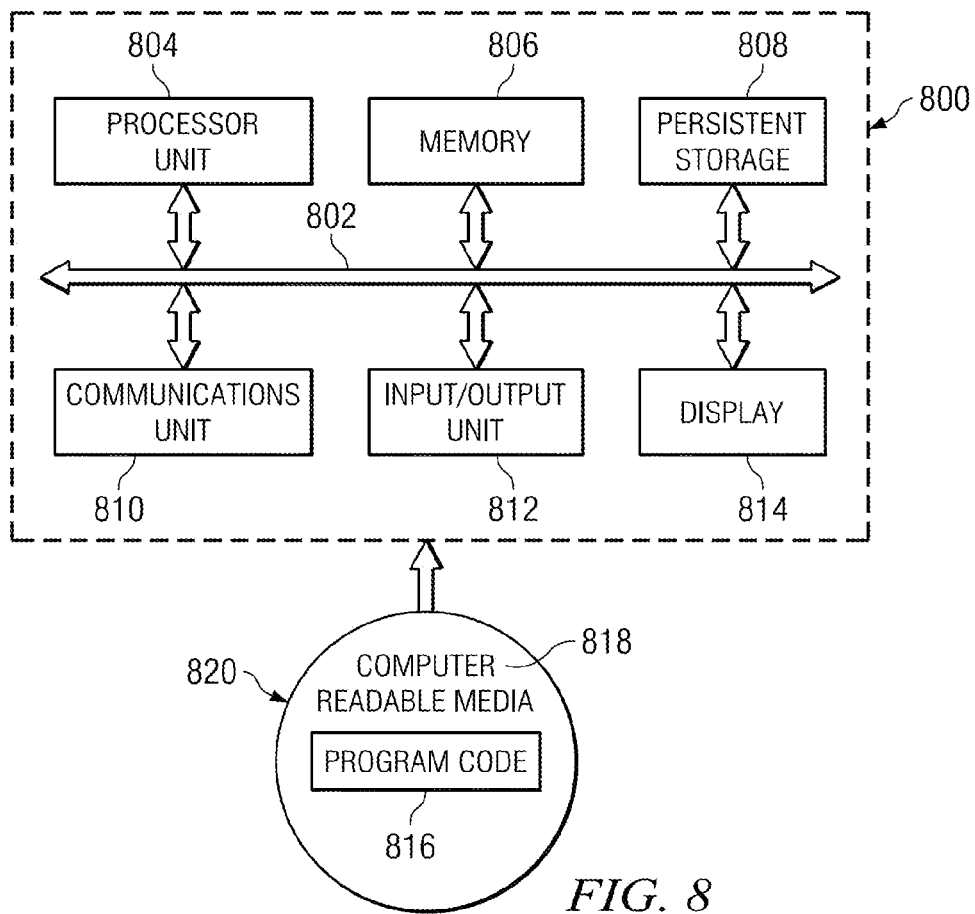
FIG. 8 is a schematic diagram of a data processing system in accordance with an illustrative embodiment.

Turning now to FIG. 8, a diagram of a data processing system is depicted in accordance with an illustrative embodiment. Data processing system 800 is an example of a data processing system that may be used to implement computer 708 in FIG. 7. In this illustrative example, data processing system 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. Processor unit 804 may be a set of one or more processors or may be a multi-processor core, depending on the particular implementation. Further, processor unit 804 may be implemented using one or more heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices. A storage device is any piece of hardware that is capable of storing information either on a temporary basis and/or a permanent basis. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Input/output unit 812 also may include one or more of these devices. Further, input/output unit 812 may send output to a printer. Display 814 provides a mechanism to display information to a user.

Instructions for the operating system and applications or programs are located on persistent storage 808. These instructions may be loaded into memory 806 for execution by processor unit 804. The processes of the different embodiments may be performed by processor unit 804 using computer implemented instructions, which may be located in a memory, such as memory 806.

These instructions are referred to as program code, computer usable program code, or computer readable program code that may be read and executed by a processor in processor unit 804. The program code in the different embodiments may be embodied on different physical or tangible computer readable media, such as memory 806 or persistent storage 808.

Program code 816 is located in a functional form on computer readable media 818 that is selectively removable and may be loaded onto or transferred to data processing system 800 for execution by processor unit 804. Program code 816 and computer readable media 818 form computer program product 820 in these examples.

In one example, computer readable media 818 may be in a tangible form such as, for example, an optical or magnetic disc that is inserted or placed into a drive or other device that is part of persistent storage 808 for transfer onto a storage device, such as a hard drive that is part of persistent storage 808.

In a tangible form, computer readable media 818 also may take the form of a persistent storage, such as a hard drive, a thumb drive, or a flash memory that is connected to data processing system 800. The tangible form of computer readable media 818 is also referred to as computer recordable storage media. In some instances, computer readable media 818 may not be removable.

Alternatively, program code 816 may be transferred to data processing system 800 from computer readable media 818 through a communications link to communications unit 810 and/or through a connection to input/output unit 812. The communications link and/or the connection may be physical or wireless in the illustrative examples. The computer readable media also may take the form of non-tangible media, such as communications links or wireless transmissions containing the program code.

In some illustrative embodiments, program code 816 may be downloaded over a network to persistent storage 808 from another device or data processing system for use within data processing system 800. For instance, program code stored in a computer readable storage medium in a server data processing system may be downloaded over a network from the server to data processing system 800.

The data processing system providing program code 816 may be a server computer, a client computer, or some other device capable of storing and transmitting program code 816. The different components illustrated for data processing system 800 are not meant to provide architectural limitations to the manner in which different embodiments may be implemented.

The different illustrative embodiments may be implemented in a data processing system including components in addition to, or in place of, those illustrated for data processing system 800. Other components shown in FIG. 8 can be varied from the illustrative examples shown. The different embodiments may be implemented using any hardware device or system capable of executing program code.

As one example, the data processing system may include organic components integrated with inorganic components and/or may be comprised entirely of organic components excluding a human being. For example, a storage device may be comprised of an organic semiconductor.

As another example, a storage device in data processing system 800 is any hardware apparatus that may store data. Memory 806, persistent storage 808 and computer readable media 818 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 806 or a cache, such as found in an interface, and memory controller hub that may be present in communications fabric 802.

Figure 9:
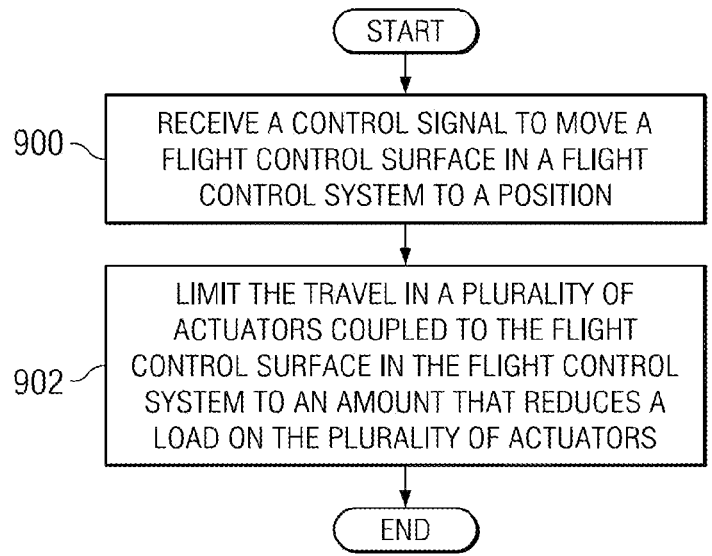
FIG. 9 is a flowchart of a process for managing a flight control system in an aircraft in accordance with an advantageous embodiment.

With reference now to FIG. 9, a flowchart of a process for managing a flight control system in an aircraft is depicted in accordance with an advantageous embodiment. The process illustrated in FIG. 9 may be implemented using a flight control system such as, for example, flight control system 700 in FIG. 7. More specifically, the process illustrated in FIG. 9 may be implemented in a software process such as, for example, control law 716 executing on computer 708 in FIG. 7.

The process begins by receiving a control signal to move a flight control surface in a flight control system to a position (operation 900). In response to receiving the control signal while the aircraft is on the ground, the process limits the travel in a number of actuators within a plurality of actuators coupled to the flight control surface in the flight control system to an amount that reduces a load on the plurality of actuators (operation 902), with the process terminating thereafter. This number of actuators may include all of the plurality of actuators or some subset of the plurality of actuators. By reducing the load on the plurality of actuators, loads also may be reduced on other structures that may be coupled directly and/or indirectly to the plurality of actuators.

Figure 10:
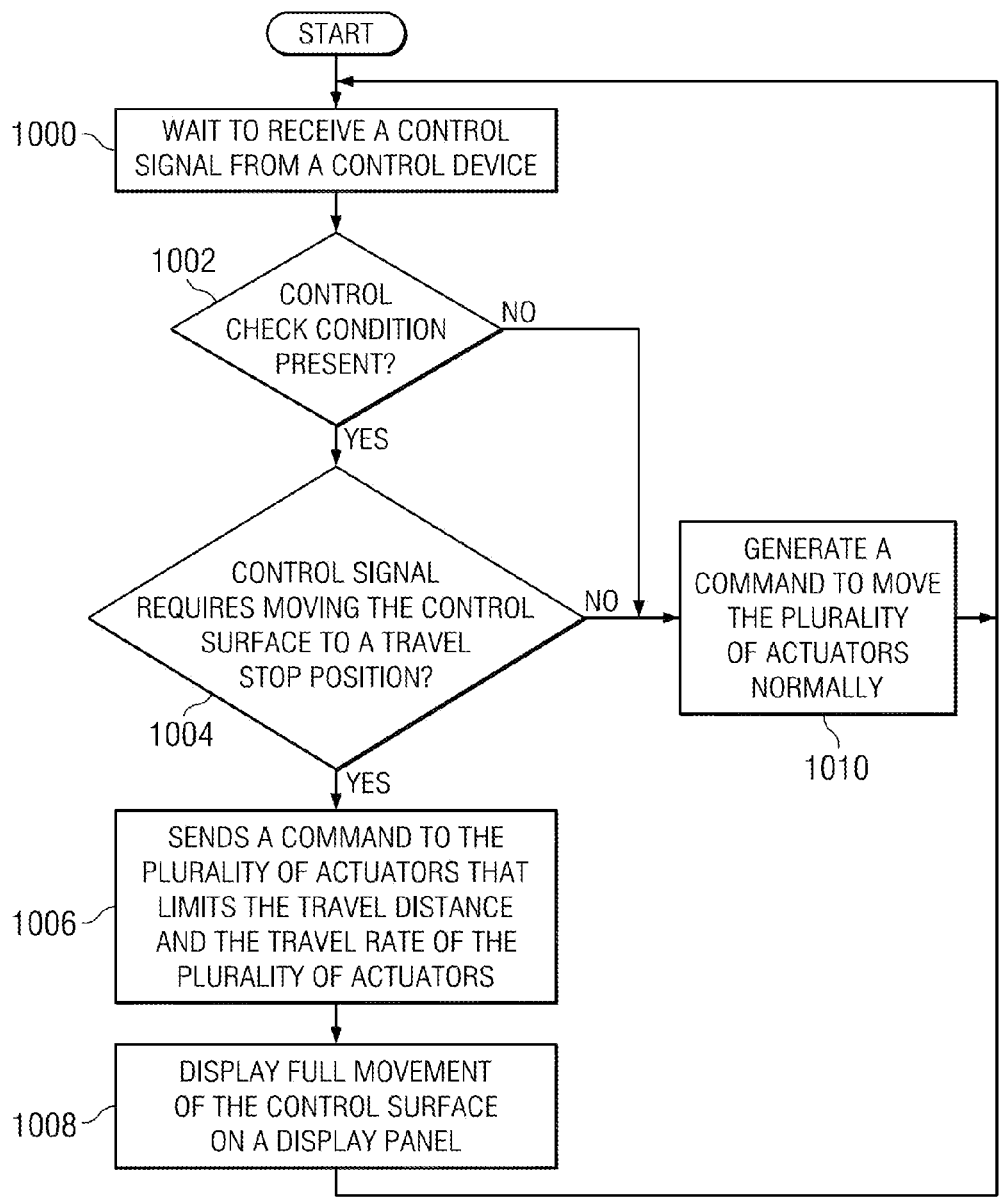
FIG. 10 is a flowchart of a process for managing a flight control system in an aircraft in accordance with an advantageous embodiment.

Turning now to FIG. 10, a flowchart of a process for managing a flight control system in an aircraft is depicted in accordance with an advantageous embodiment. The process illustrated in FIG. 10 may be implemented in a flight control system such as, for example, flight control system 700 in FIG. 7. The process may be in a software process such as, for example, control law 716 executing on computer 708 in FIG. 7.

The process begins by waiting to receive a control signal from a control device (operation 1000). This control device may be, for example, a control column and/or rudder pedals. When a control signal is received, a determination is made as to whether a control check condition is present (operation 1002). The control check condition may be present if the aircraft is on the ground and moving at a speed less than a threshold. In some cases, the threshold may require the aircraft to have a speed of zero. If the control check condition is present, a determination is made as to whether the control signal requires moving the control surface to a travel stop position (operation 1004).

If the control signal requires moving the control surface to a travel stop position, the process sends a command to the plurality of actuators that limits the travel distance and the travel rate of the plurality of actuators (operation 1006). The limit in the travel rate may be, for example, around 50 percent of the full travel rate of the actuators. The travel distance may be, for example, around 90 percent of the full travel distance of the actuators. Of course, other rates and travel distances may be used, depending on the particular implementation.

The process then displays a full movement of the control surface on a display panel (operation 1008). This operation allows the operator or maintenance person to see that the control surface has been moved for the control check, even though the control surface has not been moved to the full travel stop position.

With reference again to operation 1004, if a control signal does not require moving the control surface to a full travel stop position, the process generates a command to move the plurality of actuators normally (operation 1010). This movement may be to move the control surface using a single actuator within the plurality of actuators, or some other number of actuators.

With reference again to operation 1002, if the control check condition is not present, the process also proceeds to operation 1010 as described above.

Figure 11:
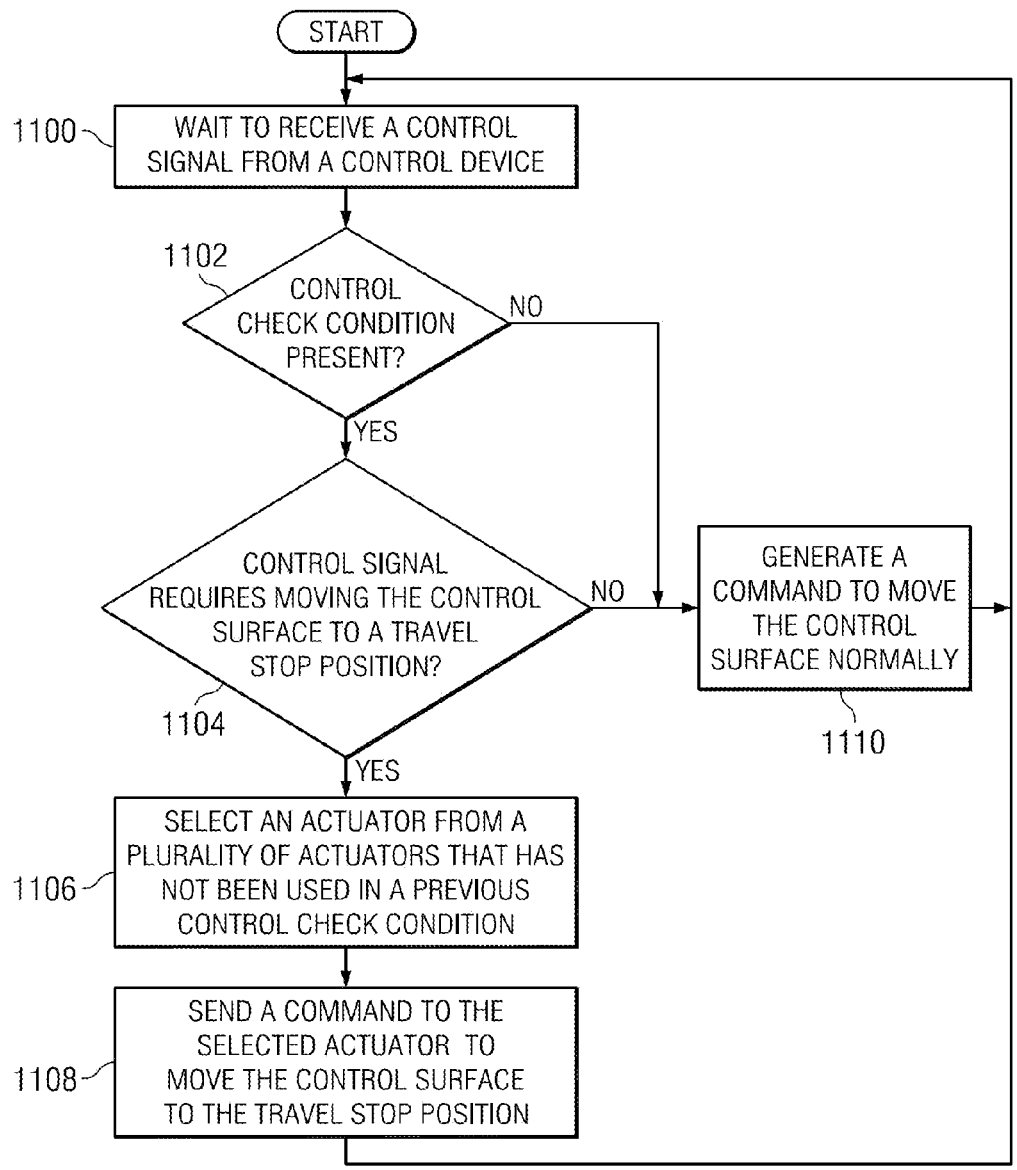
FIG. 11 is a flowchart of a process for managing a flight control system in an aircraft in accordance with an advantageous embodiment.

With reference now to FIG. 11, a flowchart of a process for managing a flight control system is depicted in accordance with an advantageous embodiment. The process illustrated in FIG. 11 may be implemented in a software process, such as control law 716 executing on computer 708 in FIG. 7.

The process begins by waiting to receive a control signal from a control device (operation 1100). When a control signal is received, a determination is made as to whether a control check condition is present (operation 1102). If the control check condition is present, a determination is made as to whether the control signal requires moving the control surface to a travel stop position (operation 1104).

If the control signal requires moving the control surface to a travel stop position, the process selects an actuator from a plurality of actuators that has not been used in a previous control check condition (operation 1106). The process then sends a command to the selected actuator to move the control surface to the travel stop position (operation 1108). The process then returns to operation 1100.

With reference again to operation 1104, if the control signal does not require moving the control surface to the travel stop position, the process generates a command to move the control surface normally (operation 1110), with the process then returning to operation 1100. This command moves only a single actuator in these examples. Of course, depending on the particular implementation, more than one actuator may be used to move a control surface while the aircraft is on the ground and the speed of the aircraft is less than a threshold.

With reference again to operation 1102, if the control check condition is absent, the process also proceeds to operation 1110, as described above.

Thus, the different advantageous embodiments provide a capability to manage the movement of a flight control surface on an aircraft. A control signal to move a flight control surface to a position is received. In response to receiving the control signal while the aircraft is on the ground and the speed of the aircraft is less than a threshold, the travel in the plurality of actuators coupled to the flight control surface may be limited to an amount that reduces a load on the plurality of actuators.

The different advantageous embodiments provide a capability to reduce the load on actuators when flight control checks are performed. The different advantageous embodiments may reduce force fights and bottoming loads that may be encountered during control checks that may be performed before flights and/or during maintenance. One or more of the different advantageous embodiments provide a capability to limit the movement of the actuators in a manner that avoids having to redesign and/or replace actuators. Further, one or more of the different advantageous embodiments may provide a capability to reduce the maintenance needed for a flight control system.

The flowcharts and block diagrams in the different depicted embodiments illustrate the architecture, functionality, and operation of some possible implementations of apparatus, methods, and computer program products. In this regard, each block in the flowcharts or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch-screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. For example, although the different advantageous embodiments are described with respect to a fly-by-wire system, some advantageous embodiments may be applied to other types of systems. For example, one or more of the different advantageous embodiments may be implemented in a mechanical system or an electro-mechanical system. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing movement of a flight control surface on an aircraft, the method comprising:
   receiving a control signal, in a computer, to move the flight control surface to an end stop position associated with the flight control surface;
   using a number of actuators in a plurality of actuators coupled to the flight control surface to move the flight control surface; and
   limiting a travel towards the end stop position, using the computer and responsive to receiving the control signal while the aircraft is on a ground and a speed of the aircraft is less than a threshold, in the number of actuators to an amount that reduces at least one of a bottoming load and a mismatched load on the number of actuators in the plurality of actuators.

2. The method of claim 1, wherein limiting the travel further comprises limiting at least one of a travel rate and a travel distance for the number of actuators in the plurality of actuators.

3. The method of claim 1, wherein limiting the travel further comprises limiting the travel to around 90 percent of a full travel distance to reduce at least one of the bottoming load and the mismatched load on the number of actuators in the plurality of actuators.

4. The method of claim 1, wherein limiting the travel further comprises limiting a travel rate, using the computer, in the number of actuators in the plurality of actuators to a travel rate of around 50 percent of a full travel rate to reduce at least one of the bottoming load and the mismatched load on the number of actuators in the plurality of actuators.

5. The method of claim 1, wherein limiting the travel further comprises limiting a travel rate, using the computer, of the number of actuators in the plurality of actuators to around 50 percent of a full travel rate and a travel distance for the number of actuators in the plurality of actuators to around 90 percent of a full travel distance to reduce at least one of the bottoming load and the mismatched load on an actuator of the number of actuators or the plurality of actuators.

6. The method of claim 1, wherein the limiting step comprises:
 responsive to receiving the control signal while the aircraft is on the ground, selecting a portion of the plurality of actuators from actuators that were unused in a previous flight to form the number of actuators; and
 responsive to receiving the control signal while the aircraft is on the ground, operating only the number of actuators to move the flight control surface.

7. The method of claim 1, wherein the receiving step comprises:
 receiving the control signal to move the flight control surface to the position in response to a manipulation of a rudder pedal in the aircraft.

8. The method of claim 1, wherein the method is a process executed by a data processing system.

9. The method of claim 1, wherein the aircraft is selected from one of an airplane and a helicopter.

10. The method of claim 1, wherein the flight control surface is selected from one of a rudder, a flap, an aileron, a spoiler, an elevator, and an airbrake.

11. An apparatus comprising:
 a computer configured to:
  receive a control signal to move a flight control surface on an aircraft to an end stop position associated with the flight control surface;
  use a number of actuators in a plurality of actuators coupled to the flight control surface to move the flight control surface; and
  limit travel towards the end stop position in the number of actuators to an amount that reduces at least one of a bottoming load and a mismatched load on the number of actuators in the plurality of actuators while the aircraft is on a ground and a speed of the aircraft is less than a threshold.

12. The apparatus of claim 11 further comprising:
 the plurality of actuators; and
 the flight control surface.

13. The apparatus of claim 11, further comprising the computer configured to limit the travel by limiting at least one of a travel rate and a travel distance for the number of actuators in the plurality of actuators.

14. The apparatus of claim 11, further comprising the computer being configured to select a portion of the plurality of actuators from actuators that were unused in a previous flight control check to form the number of actuators, and operating only the number of actuators to move the flight control surface.

15. A non-transitory computer readable storage medium storing a computer program product for managing movement of a flight control surface on an aircraft, the computer program product comprising:
 a program code, that when executed by a processor, causing the processor to:
  receive a control signal to move the flight control surface to an end stop position associated with the flight control surface;
  use a number of actuators in a plurality of actuators coupled to the flight control surface to move the flight control surface; and,
  responsive to receiving the control signal while the aircraft is on a ground and a speed of the aircraft is less than a threshold, limit travel towards the end stop position in the number of actuators to an amount that reduces at least one of a bottoming load and a mismatched load on the plurality of actuators.

16. The non-transitory computer readable storage medium of claim 15, further comprising the program code causing the processor to limit the travel in the number of actuators in the plurality of actuators to the amount that reduces at least one of the bottoming load and the mismatched load on the number of actuators in the plurality of actuators by limiting at least one of a travel rate and a travel distance for the number of actuators in the plurality of actuators.

17. The non-transitory computer readable storage medium of claim 15, further comprising the program code causing the processor to limit the travel of all of the plurality of actuators to around 90 percent of a full travel distance to reduce at least one of the bottoming load and the mismatched load on the plurality of actuators.

18. The non-transitory computer readable storage medium of claim 15, further comprising the program code causing the processor to limit the travel by limiting a travel rate in all of the plurality of actuators to a travel rate of around 50 percent of a full travel rate to reduce at least one of the bottoming load or the mismatched load on the plurality of actuators.

19. The non-transitory computer readable storage medium of claim 15, further comprising the program code causing the processor to select a portion of the plurality of actuators from actuators that were unused in a previous flight to form the number of actuators, and to operate only the number of actuators to move the flight control surface.

* * * * *